(12) United States Patent
Agusa

(10) Patent No.: US 8,575,487 B2
(45) Date of Patent: Nov. 5, 2013

(54) WIRE HARNESS PROTECTOR

(75) Inventor: Narihiro Agusa, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 71 days.

(21) Appl. No.: 13/503,774

(22) PCT Filed: Jun. 24, 2010

(86) PCT No.: PCT/JP2010/060714
§ 371 (c)(1),
(2), (4) Date: Apr. 24, 2012

(87) PCT Pub. No.: WO2011/061960
PCT Pub. Date: May 26, 2011

(65) Prior Publication Data
US 2012/0217033 A1     Aug. 30, 2012

(30) Foreign Application Priority Data

Nov. 18, 2009 (JP) .................... 2009-263038

(51) Int. Cl.
*H02G 3/04* (2006.01)
(52) U.S. Cl.
USPC ......... 174/68.3; 174/72 A; 174/95; 174/70 C; 248/49; 439/207
(58) Field of Classification Search
USPC .............. 174/68.1, 68.3, 72 A, 135, 95, 99 R, 174/71 R, 70 C, 72 TR; 52/220.1, 220.7; 385/134, 136; 248/49; 439/207, 212
See application file for complete search history.

(56) References Cited

U.S. PATENT DOCUMENTS

| | | | | |
|---|---|---|---|---|
| 4,891,471 A * | 1/1990 | Ono et al. | .................... | 174/68.3 |
| 6,444,903 B2 * | 9/2002 | Saeki et al. | ................. | 174/72 A |
| 7,017,615 B2 * | 3/2006 | Suzuki et al. | ................ | 174/68.3 |
| 7,378,592 B2 * | 5/2008 | Suzuki et al. | ................ | 174/72 A |
| 7,964,796 B2 * | 6/2011 | Suzuki | ........................ | 174/72 C |
| 8,124,887 B2 * | 2/2012 | Suzuki | ........................ | 174/481 |
| 8,188,368 B2 * | 5/2012 | Suzuki | ........................ | 174/72 A |
| 8,304,653 B2 * | 11/2012 | Suzuki | ........................ | 174/72 A |

FOREIGN PATENT DOCUMENTS

| | | |
|---|---|---|
| JP | 07-245839 | 9/1995 |
| JP | 7-308013 | 11/1995 |
| JP | 2000-236608 | 8/2000 |
| JP | 2008-125274 | 5/2008 |

* cited by examiner

*Primary Examiner* — Angel R Estrada
(74) *Attorney, Agent, or Firm* — Greenblum & Bernstein P.L.C.

(57) ABSTRACT

A first trunk line of a wire harness is inserted into a wire harness insertion space of a protector main body, and branch lines pulled out and branching to the left and right from the outlet are respectively bound to a second trunk line routed in left and right directions to form a triangular space enclosed by the left and right branch lines and the second trunk line. An elongated portion projecting to a position covering the triangular space is provided to the lid which makes a lock connection to close an opening of the protector main body, and while a male engagement portion protrudes on the elongated portion, a female engagement portion to which the male engagement portion engages and latches is provided from the bottom wall of the protector main body, and the lid connects to the protector main body in the triangular space.

2 Claims, 6 Drawing Sheets

WIRE HARNESS PROTECTOR

FIELD OF THE INVENTION

The present invention relates to a wire harness protector, and, in a protector locking and connecting a lid to a protector main body after the wire harness has been passed therethrough, improves a lock structure with the lid at an outlet point through which the wire harness is pulled out and branches from the protector main body.

BACKGROUND OF THE INVENTION

A wire harness routed in a vehicle has as its object to protect a collection of electrical wires from outside interference by other vehicular instruments as well as to confine a wiring pathway, and in many cases a protector configured from resin-molded components is attached thereto. As a protector of this type, as in the protector 1 shown in FIG. 9, protectors are known in which a tubular body is divided into a main body 2 and a lid 3, the main body 2 and the lid 3 are respectively provided with a lock 4 and a locking latch 5, then the wire harness is inserted through the main body 2 and, in a state where the wire harness is pulled out from both end openings of the main body 2, the lid 3 is closed to lock and connect to the main body 2. (See Japanese Patent Laid-open Publication No. H07-245839.)

The protector 1 is provided with a configuration in which an electrical wire latching baffle plate 6 jutting into a top surface opening side projects from upper ends of both lateral walls 2a of the main body 2, the harness inserted through the main body 2 interior is pressed from above by the electrical wire latching baffle plate 6, and thus lifting and protrusion of the electrical wires may be prevented, and pinching when the lid 3 is closed, lifting of the lid 3, and so on may be prevented.

However, in recent years, the type of instruments provided in the engine compartment of a vehicle has increased and a reduction of the harness deployment space has been sought; accordingly, there are cases where a thin-form protector is employed, and there is difficulty in providing complex structures such as the electrical wire latching baffle plate 6 of the protector 1 as described above to such a thin-form protector.

In particular, as shown in FIG. 10, in a case where a trunk line 106 of a wire harness 105 is passed into a protector 100, then branches 107 branching from the trunk line 106 are pulled out and branch to the left and right from an outlet 103 of a harness insertion space in the protector 100, conventionally the branches 107 have been bound by a tape 108. Thus, as shown in FIG. 11A, the shape of the trunk line 106 at a root portion of the branch 107 has become nearly circular in cross-section, a thickness (height) D1 thereof has increased, and the thickness D1 of the trunk line 106 has grown greater than a height H1 of the harness insertion space in the protector 100. As a result, as shown in FIG. 11B, there have been circumstances in which the lid 102 of the protector 100 has been pushed up by the tape-bound portion of the trunk line 106, the lid 102 has become easily opened by the lock connection breaking between the lid 102 and the protector main body 101, and the lid 102 and peripheral components have interfered with one another.

RELATED ART

Patent Literature

Related Art 1: Japanese Patent Laid-open Publication No. H07-245839

SUMMARY OF THE INVENTION

Problems to be Solved by the Invention

The present invention has been conceived in view of the above-described circumstances, and in a case where a wire harness protector is attached up to a root of the harness branch, then the harness is pulled out and branches from an outlet of the harness insertion space in the protector, the present invention has as its objective to prevent lifting, opening, and so on of the protector lid, and to block interference between the lid and peripheral components.

Means for Solving the Problems

In order to resolve the above objective, the present invention provides a wire harness protector which is a protector formed of molded resin and configured from a protector main body having a shape which encloses a wire harness insertion space with a bottom wall and two side walls, and a lid including a lock which fixes the lid to the main body by closing an opening opposite to the bottom wall after insertion of a first trunk line of the wire harness routed in a vehicle into the protector main body; in which the first trunk line is pulled out and branches to the left and right from an outlet of the wire harness insertion space in the protector main body, the left and right direction branch lines are respectively bound to a second trunk line of the wire harness routed in left and right directions along the outlet, and a space is enclosed on three sides formed of the left and right direction branch lines and the second trunk line; and having a configuration in which an elongated portion projecting to a position covering the space is provided to the lid; a male engagement portion protrudes toward the bottom wall of the protector main body on the elongated portion, while a female engagement portion to which the male engagement portion engages and latches is provided from the bottom wall of the protector main body; and the lid connects to the protector main body between the left and right branch lines.

In this way, the entirety of the tri-directional branch portion configured from the first trunk line of the wire harness inserted through the protector and from the branch lines branching to the left and right from the first trunk line is not bound; instead, by binding each branch line with a second trunk line deployed along an outlet of the protector main body, there is no need to bind the first trunk line inserted within the protector, and it is possible to break up the electrical wires of the first trunk line in the width direction. Accordingly, as compared to a case where the trunk line is conventionally bound in a round shape, the trunk line may be made flat and the thickness thereof made thinner, and the height of the harness insertion space in the protector may be lowered; thus, opening of the lid due to the trunk line pushing up on the lid which caps the protector main body may be prevented, and also interference between the lid and peripheral components may be prevented.

Meanwhile, in a case where the entirety of the tri-directional branch portion is not bound, introduction of a curving bend branching into each branch line from the first trunk line is difficult and there is also concern that the lid will be pushed up by the rigidity of the electrical wire bundle. However, by not binding the entirety of the branch portion, the protector has a configuration allowing a roughly triangular space enclosed on three sides and formed between the left and right branch lines to be employed and allowing the male engagement portion formed on the elongated portion of the lid and the female engagement portion formed on the bottom wall of the protector main body to engage and latch at the triangular space; thus, the lid and the protector main body may be reliably closed and connected to one another in the vicinity of the outlet of the harness insertion space where the lid is most likely to lift up, and opening of the lid may be effectively prevented.

In addition, the male engagement portion and the female engagement portion are connected at the triangular space formed between the left and right branch lines; thus, engagement and latching is possible without pinching electrical wires and, even in a rare case where pinching occurs, because the pinching occurs in the vicinity of the outlet, it is possible to easily confirm visually and to resolve the pinching.

The elongated portion of the lid is provided only at a portion projecting from a center of the lower end of the lid to cover the triangular space, or the entire lower end of the lid may also be extended downward to a position covering the triangular space.

In addition, the elongated portion may be formed in an arc shape in cross-section, the upper portion thereof being curved in a distancing direction from the bottom wall of the protector main body and, in addition, the lower portion thereof being curved in an approaching direction to the bottom wall of the protector main body. Thereby, in a case where the second trunk line deployed along the outlet of the protector main body has a robust thickness, and even in a case where thickness of the second trunk line appears due to tape-binding, the second trunk line may be comfortably covered by the elongated portion and it is possible to prevent the entirety of the lid being pushed up by the thickness of the second trunk line.

The protector main body and the lid are preferably injection-molded with a molding metallic die; are configured such that, while the male engagement portion provided on the lid has an arrowhead shape, the female engagement portion provided on the protector main body has a shape obtained by opposing a pair of J-shaped projections, and the point of the arrow of the male engagement portion is inserted and latches to the pair of J-shaped projections; and are oriented such that the cut-out direction of the male engagement portion is the same as the cut-out direction of the lid, and the cut-out direction of the female engagement portion is the same as the cut-out direction of the protector main body. By aligning the cut-out directions in this way, there is no need to add a slide to the molding metallic die and costs may be controlled.

In the protector main body, a wire pull-out portion is continuously provided from one side of a width direction at one side in a length direction of the protector main body, and in the wire pull-out portion, a downward curving portion is provided continuous from a horizontal portion, and the outlet is provided on a lower end of the downward curving portion; a lock connection portion between the protector main body and the lid is provided on two width direction sides of the horizontal portion; and an elongated portion is provided at a lower end of the lid capping the downward curving portion, the elongated portion covering the space being enclosed on three sides.

Effect of the Invention

As noted above, according to the present invention, the first trunk wire of the wire harness inserted within the protector and the branch lines pulled out and branching to the left and right from the first trunk line are not bound; rather, each branch line and the second trunk line deployed along the protector outlet are bound to one another and, accordingly, the electrical wires of the first trunk line inserted within the protector may be broken up in the width direction to lower the height thereof without binding. Accordingly, the height of the trunk line may be made lower than the height of the harness insertion space in the protector and, thus, opening of the lid due to the trunk line pushing up on the lid can be prevented, and it is also possible to block interference between the lid and peripheral components.

Further, a triangular space is formed enclosed on three sides by the second trunk line and the left and right branch lines of the first trunk line, and the elongated portion projects forming the male engagement portion on the protector lid and, in addition, the female engagement portion engaging and latching with the male engagement portion is provided on the bottom wall of the protector main body; thus, the male engagement portion and the female engagement portion may be connected without pinching electrical wires by employing the triangular space, and the lid and the protector main body may be connected in the vicinity of the outlet of the harness insertion space of the protector where the lid is most likely to lift up, and thus it is possible to reliably prevent the lid from opening.

MODE FOR CARRYING OUT THE INVENTION

Hereinafter, an embodiment of the present invention is described with reference to the drawings. A protector 10 according to an embodiment of the present invention is illustrated in FIGS. 1 through 6. The protector 10 has a first trunk line 41 of a wire harness 40 routed in an automobile inserted therein, and is configured with a protector main body 11 integrally molded of resin and a lid 31 integrally molded of resin and separate from the protector main body 11. The protector main body 11 and the lid 31 are each injection-molded with a molding metallic die.

Figure 4A:
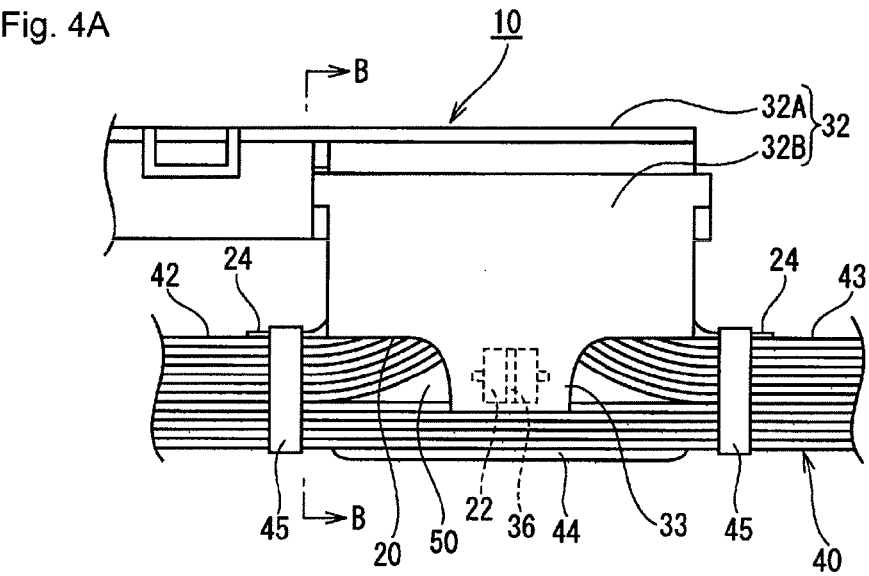
FIGS. 4A-4B illustrate a state in which a wire harness is inserted through the interior of the protector shown in FIG. 1, FIG. 4A being a front view of a main portion thereof, and FIG. 4B being a view along a line B-B in FIG. 4A.
Figure 5:
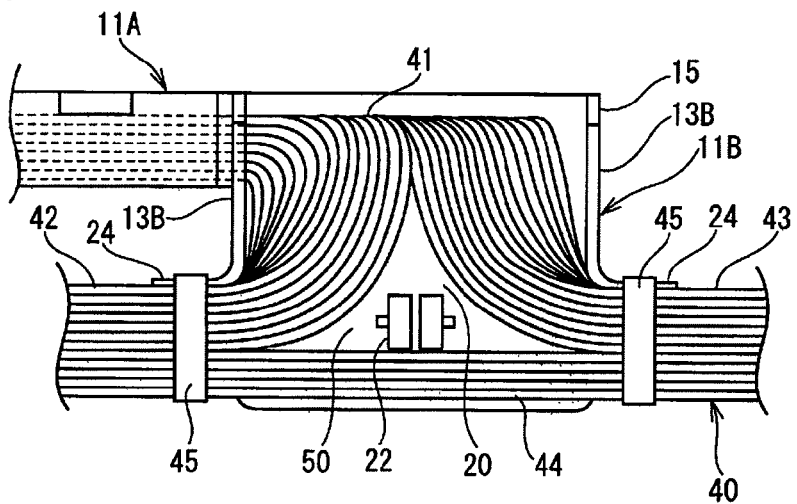
FIG. 5 is an explanatory view illustrating a wire harness wiring state within the protector shown in FIG. 1 (lid removed).

The first trunk line 41 of the wire harness 40, as shown in FIGS. 4A and 5, is pulled out and branched to the left and right from an outlet 20 of the protector 10, which will be described hereafter, and a left branch line 42 and a right branch line 43 are bound by tape-winding to a second trunk line 44 of the wire harness 40 routed along the outlet 20.

Figure 1:
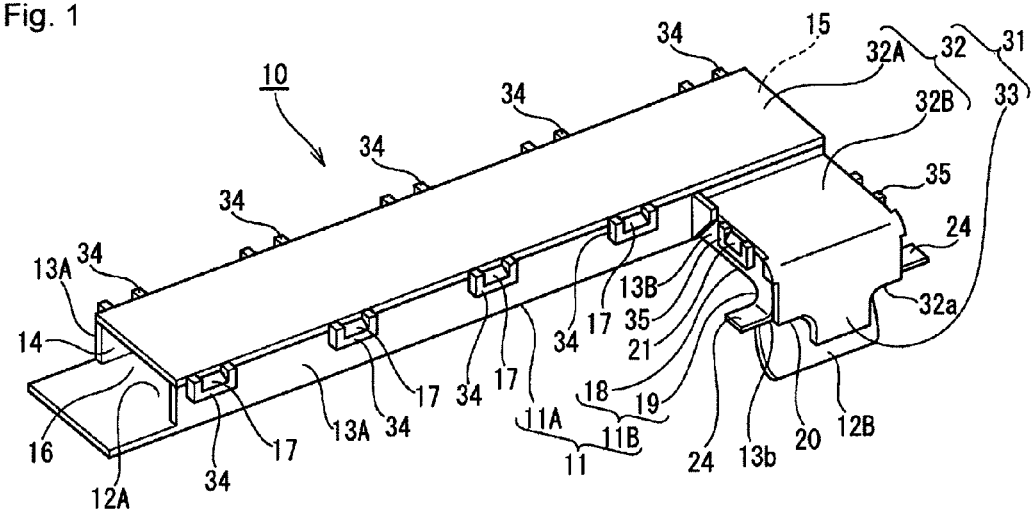
FIG. 1 is a full perspective view of a protector according to an embodiment of the present invention.

The protector main body 11, as shown in FIGS. 1 and 5, is configured from an elongated wire housing 11A in which the first trunk line 41 of the wire harness 40 is inserted and housed in a straight line, and a wire pull-out portion 11B continuously provided from one side in a width direction at one side in a length direction of the wire housing 11A. The protector main body 11 is formed in a trench shape having an open top surface provided with each of bottom walls 12A and 12B and side walls 13A and 13B standing upright from both ends in a width direction of the bottom walls 12A and 12B. The internal space of the wire housing 11A and the internal space of the wire pull-out portion 11B are mutually continuous and form a wire harness insertion space 16.

The wire housing 11A has an opening 14 at one end in the length direction; the other end on the side at which the wire pull-out portion 11B is provided has a side wall 15 provided upright to close the housing. On the outer surface of both side walls 13A in the width direction of the wire housing 11A, a plurality of lock claws 17 protrude with a predetermined space therebetween in the length direction.

Figure 2A:
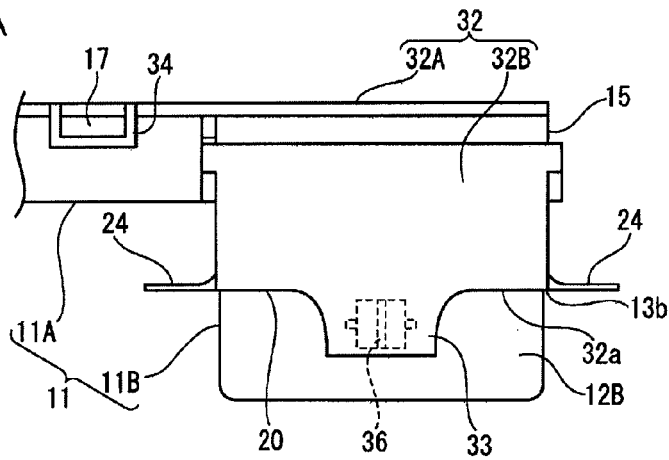
FIG. 2A is a front view of a main portion of the protector in FIG. 1.
Figure 2B:
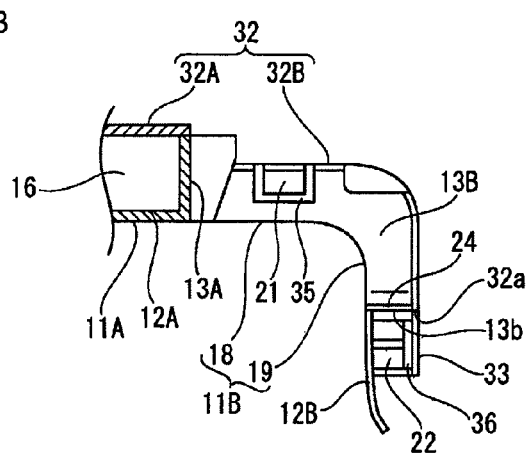
FIG. 2B is a side view of a main portion of the protector in FIG. 1.

The wire pull-out portion 11B, as shown in FIGS. 1 through 2B, is configured from a horizontal portion 18 protruding continuous from the wire housing 11A and a downward curving portion 19 provided continuous from a projecting end of the horizontal portion 18, and the lower end of the downward curving portion 19 is opened to configure the outlet 20 of the wire harness insertion space 16. A pair of lock claws 21 is formed on an outer surface of both side walls 13B of the horizontal portion 18.

From the lower ends of both side walls 13B of the downward curving portion 19, a left-right pair of tape-winding tabs 24 protrudes horizontally. Further, the bottom wall 12B of the downward curving portion 19 extends downward further than the lower end position 13b of both side walls 13B.

The lid 31, as shown in FIGS. 1 through 2B, is configured from a lid main body 32 and an elongated portion 33. The lid main body 32 is configured from a wire housing lid 32A covering the open top surface of the wire housing 11A of the protector main body 11, and a wire pull-out portion lid 32B covering the open top surface of the wire pull-out portion 11B from the horizontal portion 18 to the downward curving portion 19. The elongated portion 33 projects downward from a central portion of a lower end of the wire pull-out portion lid 32B. A lower end position 32a of the wire pull-out portion lid 32B has the same height as a lower end position 13b of both side walls 13B of the downward curving portion 19 of the protector main body 11, and the elongated portion 33 faces the bottom wall 12B of the downward curving portion 19 at a position lower than the lower end position 13b of both side walls 13B of the downward curving portion 19.

Within the lid main body 32, locking latch frames 34 latching onto the lock claws 17 of the protector main body 11 protrude downward from both side edges in the width direction of the wire housing lid 32A. Also, locking latch frames 35 latching onto the lock claws 21 protrude downward from both side edges in the width direction of the wire pull-out portion lid 32B at a section covering the horizontal portion 18 of the wire pull-out portion 11B.

Figure 3A:
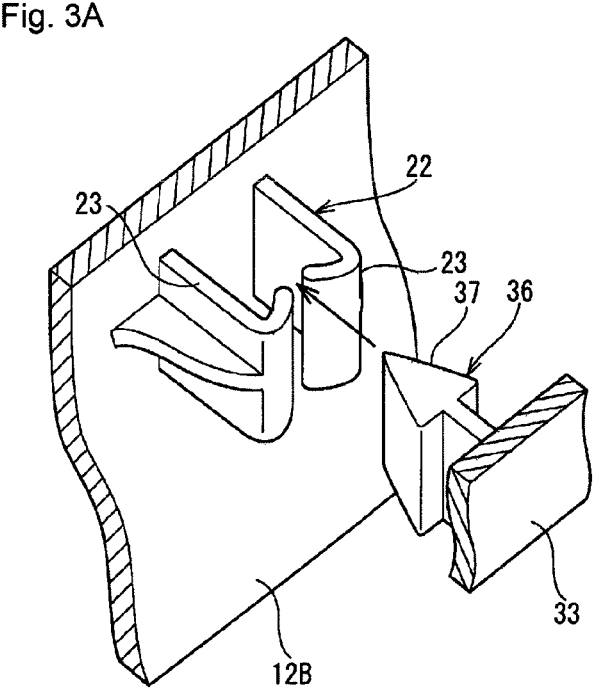
FIGS. 3A-3B illustrate a male engagement portion and a female engagement portion, FIG. 3A being a perspective view before engagement and FIG. 3B being a cross-sectional view showing an engaged state.

As shown in FIG. 3A, a male engagement portion 36 protrudes on an elongated portion 33 toward the bottom wall 12B of the downward curving portion 19 of the protector main body 11, and a female engagement portion 22 protrudes on the bottom wall 12B of the protector main body 11 engaging and latching with the male engagement portion 36.

Figure 3B:
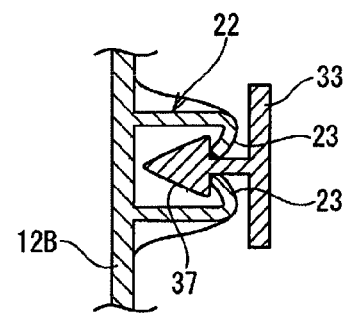

The male engagement portion 36 has the same cut-out direction as the cut-out direction of the lid 31, i.e., in the elongation direction (vertical direction) of the elongated portion 33, and the shape is shaped as an arrowhead in cross-section which is continuous in the cut-out direction. The female engagement portion 22 has the same cut-out direction as the cut-out direction of the protector main body 11, i.e., in the curvature direction (vertical direction) of the downward curving portion 19, and the shape is J-shaped in cross-section, formed by providing a pair of J-shaped projections 23 which are continuous in the cut-out direction facing each other. The male engagement portion 36 and the female engagement portion 22 are configured such that, as shown in FIG. 3A, an arrow point 37 of the male engagement portion 36 is inserted so as to push open the pair of J-shaped projections 23 and, as shown in FIG. 3B, the arrow point 37 is latched from both sides by the pair of J-shaped projections 23 being elastically restored after insertion of the arrow point 37, and is engaged thereby.

When the first trunk line 41 of the wire harness 40 is wired in the protector 10 of the above-described configuration, as shown in FIG. 5, the tri-directional branch points of the first trunk line 41 and the left and right branch lines 42 and 43 are not bound by tape-winding; rather, the electrical wire bundle is pulled out and branched to the left and right from the outlet 20 in a broken up state. The left and right branch lines 42 and 43 which have been pulled out are each bound by a tape 45 to the second trunk line 44. At this time, a triangular space 50 is formed in the portion covered by the elongated portion 33 of the lid 31, enclosed on three sides by the left and right direction branch lines 42 and 43 and by the second trunk line 44.

Figure 6:
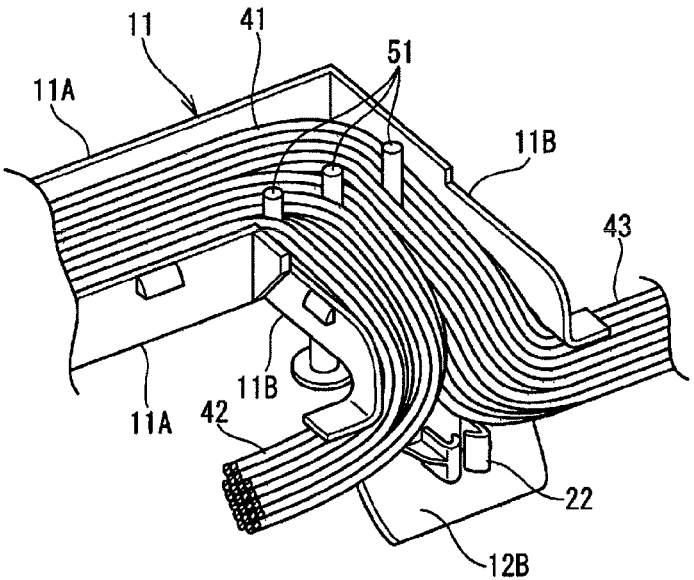
FIG. 6 is a perspective view illustrating an example of a method for passing the wire harness through the interior of the protector.

Furthermore, in the present embodiment, in a wiring process of the wire harness 40, as shown in FIG. 6, the protector main body 11 is penetrated by and fixated to a fork jig 51 standing upright on an assembly stage, then the first trunk line 41 is broken up and made flat in the width direction of the protector main body 11 at the fork jig 51.

Figure 4B:
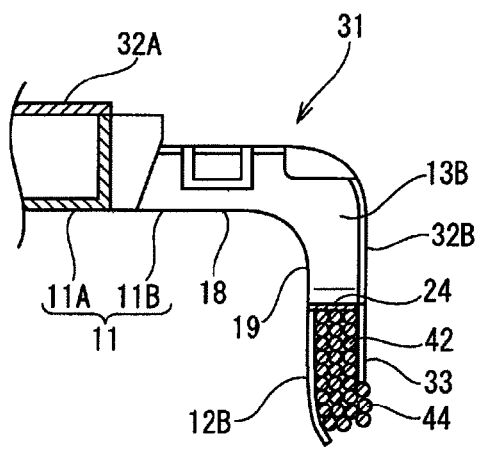

In this way, the first trunk line 41 of the wire harness 40 is inserted into the protector 10 of the above-described configuration, and the position of the branch portions is fixed by binding each of the left and right branch lines 42 and 43 pulled out from the outlet 20 to the second trunk line 44 with the tape 45. As shown in FIGS. 4A and 4B, it is possible to break up the electrical wires in the center of the branch portions without binding with tape, and it is possible to make the first trunk line 41 flat in the vicinity of the outlet 20 of the wire harness insertion space 16 and to reduce the thickness thereof. Accordingly, in the vicinity of the outlet 20, the lid 31 of the protector 10 may be prevented from being pushed up by the thickness of the first trunk line 41.

Further, the triangular space 50 is formed in the portion enclosed by the left and right branch lines 42 and 43 and the second trunk line 44, and the elongated portion 33 of the lid 31 of the protector 10 is formed in a position covering the triangular space 50. Thereby, as shown in FIG. 5, it is possible to engage and latch the male engagement portion 36 projecting from the elongated portion 33 and the female engagement portion 22 projecting from the side wall 12B of the protector main body 11 in the triangular space 50. Accordingly, for example, the introduction of a curving bend in the left and right directions of the branch lines 42 and 43 is not preferable, and even when the force pushing up against the lid 31 due to the rigidity of the electrical wire bundle is applied, it is possible to reliably connect the lid 31 and the protector main body 11 in a closed state in the vicinity of the outlet 20; thus, it is possible to prevent the lid 31 from being pushed up.

Due to the above, lifting, opening, and so on of the lid 31 of the protector 10 may be effectively prevented, and interference between the opened lid 31 and peripheral components may be stopped.

Moreover, with the configuration employing the triangular space 50 to lock and connect the male engagement portion 36 of the lid 31 and the female engagement portion 22 of the protector main body 11, in addition to being able to prevent pinching of electrical wires when making this lock connection, even in a rare case where pinching occurs, because the pinching occurs in the vicinity of the outlet 20, visual confirmation can be easily performed. Further still, in a case where the side walls 13B of the downward curving portion 19 of the protector main body 11 are short in a length direction, and the like, even in a case where there is no room to provide a lock structure on the side wall in the vicinity of the outlet 20, a lock structure can be provided when it effectively utilizes the triangular space 50 and, thus, a degree of freedom in routing planning can also be raised.

Further, the cut-out directions of the male engagement portion 36 and the female engagement portion 22 are made to follow the cut-out directions of the lid 31 and the protector main body 11, respectively; thus, there is no need to add a slide to the molding metallic die and costs can be controlled.

Figure 7:
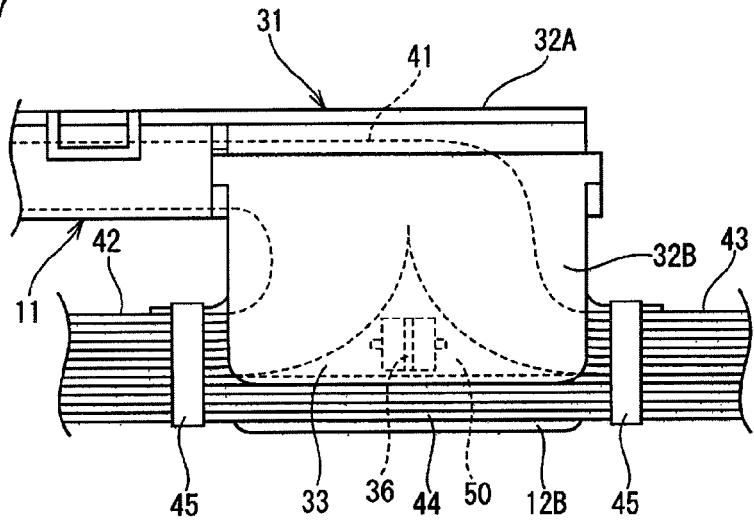
FIG. 7 is a front view of a main portion illustrating an alternate example of the embodiment.

The elongated portion 33 of the lid 31, as in an alternate example of the embodiment described above and as shown in FIG. 7, may also be formed extending downward to a position covering the triangular space 50 and spanning the entire length in the width direction of the wire pull-out portion lid 32B of the lid 31.

Figure 8:
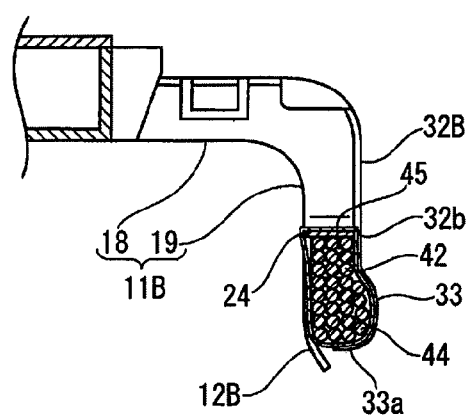
FIG. 8 is a side view of a main portion illustrating another alternate example of the embodiment.
Figure 9:
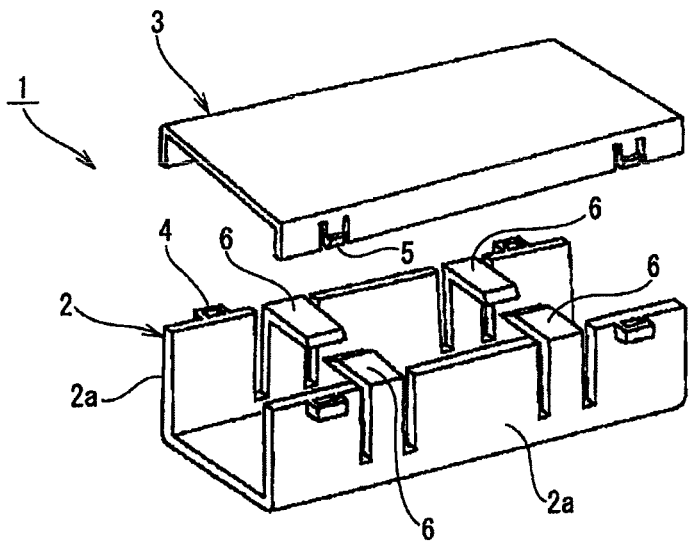
FIG. 9 is a perspective view illustrating a conventional example.
Figure 10:
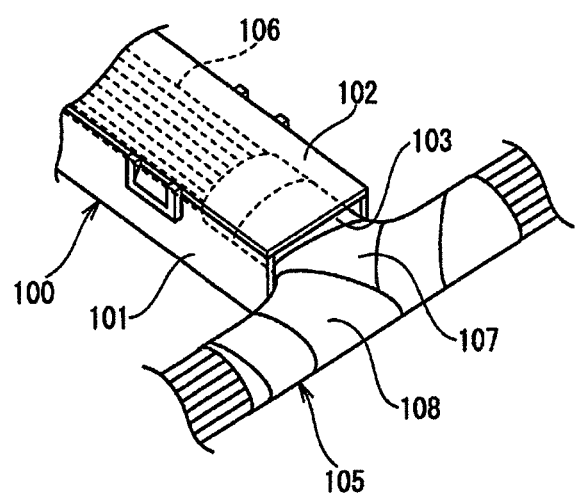
FIG. 10 is a perspective view illustrating a state in which a wire harness is passed through a protector of another conventional example.
Figure 11A:
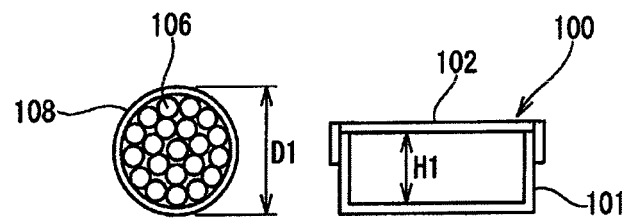
FIGS. 11A-11B are explanatory views illustrating problems with the protector shown in FIG. 10.
Figure 11B:
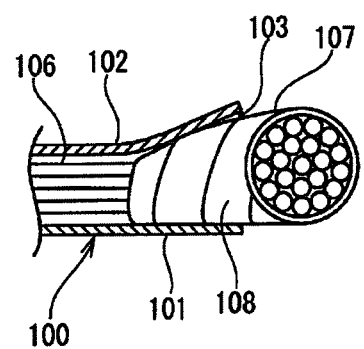

Alternatively, the elongated portion 33, as in another alternate example of the embodiment and as shown in FIG. 8, may also be formed extending to a position covering the second trunk line 44 and passing over the triangular space 50 and spanning the entire length in the width direction of the wire pull-out portion lid 32B. In this case, it is preferable that the elongated portion 33 project and curve in an arc in cross-section so as to approach the bottom wall 12B after swelling outward from the lower end 32b of the wire pull-out portion lid 32B. Thereby, the elongated portion 33 can comfortably cover the branch lines 42 and 43 and the second trunk line 44, where the thickness due to binding with the tape 45 is likely to occur. Accordingly, it is possible to prevent flaws in the engagement connection between the male engagement portion 36 and the female engagement portion 22 due to the elongated portion 33 being pushed up, and it is also possible to prevent position drift of a branch point due to sagging of the second trunk line 44, because the second trunk line 44 is kept at the lower end 33a of the elongated portion 33.

Description of Reference Numerals 10 protector
11 protector main body
11A wire housing
11B wire pull-out portion
18 horizontal portion
19 downward curving portion
20 outlet
22 female engagement portion
31 lid
32 lid main body
32A wire housing lid
32B wire pull-out portion lid
33 elongated portion
36 male engagement portion
40 wire harness
41 first trunk line
42, 43 branch line
44 second trunk line

The invention claimed is:

1. A wire harness protector formed of molded resin components, comprising:
    a protector main body having a shape which encloses a wire harness insertion space with a bottom wall and two side walls; and
    a lid including a lock which fixes the lid to the main body by closing an opening opposite to the bottom wall after insertion of a first trunk line of a wire harness routed in a vehicle into the protector main body; wherein
        the first trunk line is pulled out and branches to the left and right from an outlet of the wire harness insertion space in the protector main body;
        the left and right direction branch lines are respectively bound to a second trunk line of the wire harness routed in left and right directions along the outlet; and
        a space is enclosed on three sides formed of the left and right direction branch lines and the second trunk line; and
    the wire harness protector having a configuration wherein
        an elongated portion projecting to a position covering the space is provided to the lid;
        a male engagement portion protrudes toward the bottom wall of the protector main body on the elongated portion, while a female engagement portion to which the male engagement portion engages and latches is provided on the bottom wall of the protector main body; and
        the lid connects to the protector main body between the left and right branch lines; and
    a wire pull-out portion is continuously provided from one side in a width direction at one side in a length direction of the protector main body, the wire pull-out portion including:
        a downward curving portion provided continuous from a horizontal portion,
        the outlet provided on a lower end of the downward curving portion, and
        a lock connection portion between the protector main body and the lid provided on two width direction sides of the horizontal portion; and
        the elongated portion is provided at a lower end of the lid capping the downward curving portion.

2. The wire harness protector according to claim 1, wherein the protector main body and the lid are injection-molded with a molding metallic die, and are configured such that the male engagement portion provided on the lid has an arrowhead shape, the female engagement portion provided on the protector main body has a shape obtained by opposing a pair of J-shaped projections, and the arrow point of the male engagement portion is inserted and latches to the pair of J-shaped projections, wherein
    the protector main body and the lid are oriented such that a cut-out direction of the male engagement portion is the same as a cut-out direction of the lid, and a cut-out direction of the female engagement portion is the same as a cut-out direction of the protector main body.

* * * * *